United States Patent [19]

Borel

[11] Patent Number: 4,702,623
[45] Date of Patent: Oct. 27, 1987

[54] LINEAR BEARING FOR CONTINUOUS LONGITUDINAL MOVEMENT

[75] Inventor: Denis Borel, Wallisellen, Switzerland

[73] Assignee: SRO Kugellagerwerke, J. Schmid-Roost, Switzerland

[21] Appl. No.: 913,778

[22] Filed: Sep. 30, 1986

[30] Foreign Application Priority Data

Oct. 1, 1985 [EP] European Pat. Off. ........ 85112399.2

[51] Int. Cl.⁴ .............................................. F16C 29/06
[52] U.S. Cl. .......................................... 384/45; 384/44
[58] Field of Search ..................................... 384/43–45

[56] References Cited

U.S. PATENT DOCUMENTS

| 2,230,442 | 2/1941 | Arms | 384/44 |
|---|---|---|---|
| 4,302,059 | 11/1981 | Teramachi | 384/44 |
| 4,420,194 | 12/1983 | Asami | 384/45 |
| 4,438,985 | 3/1984 | Borel . | |
| 4,496,198 | 1/1985 | Geka | 308/6 C |
| 4,527,840 | 7/1985 | Mugglestone et al. | 384/45 |
| 4,563,045 | 1/1986 | Katayama | 384/44 |

FOREIGN PATENT DOCUMENTS

| 1914451 | 10/1970 | Fed. Rep. of Germany | 384/45 |
|---|---|---|---|
| 3400849 | 8/1984 | Fed. Rep. of Germany . | |
| 58-622 | 1/1983 | Japan | 384/44 |

Primary Examiner—Stuart S. Levy
Assistant Examiner—Thomas R. Hannon
Attorney, Agent, or Firm—Ostrolenk, Faber, Gerb & Soffen

[57] ABSTRACT

A linear bearing for continuous longitudinal movement in which friction due to changes in the direction of rotation of the rollers is eliminated or substantially reduced. The linear bearing comprises a housing which defines at least one closed roller orbit having an inner surface and an outer surface for accommodating a plurality of rollers. Each roller orbit also comprises a load zone and a return travel zone, which are interconnected at both ends by reversal regions. The load zone is partly defined by a raceway located in the housing adjacent to the load zone for applying a load to the rollers, the raceway forming part of the outer surface of each roller orbit. Respective section planes of the rollers in the load zone and the rollers in the return travel zone intersect along an axis which extends parallel to the load zone, and advantageously define an angle of about 15° to 60°, or more preferably about 40° to 50°. Each of the reversal regions includes a transitional region that is approximately helically curved, and a two-dimensionally curved region in which the axes of rotation of the rollers are substantially parallel to the axes of rotation of the rollers in the return travel zone.

16 Claims, 6 Drawing Figures

LINEAR BEARING FOR CONTINUOUS LONGITUDINAL MOVEMENT

BACKGROUND OF THE INVENTION

1. Field of the Invention

The present invention refers to a linear bearing for continuous longitudinal movement, and more particularly to a linear bearing comprising a housing for being moveably supported by rollers on a travel rail, the housing defining a closed roller orbit including a load zone, two reversal regions, and a return travel zone.

2. Description of Related Art

Various linear bearings of this same general type are known and have been used for a long time. In these prior systems, upon movement of the housing with respect to the travel rail, the rolling elements revolve in closed orbit paths. Generally, they roll satisfactorily within the load zone and the return-travel zone. Problems, however, exist in the reversal regions, particularly at the point where the rolling elements leave the load zone. More specifically, at this point the rolling elements have the direction of rotation which they had in the load zone. However, upon reaching the first reversal region, the roller elements encounter a first reversing means for reversing their travel direction. This first reversing means is stationary with respect to the rolling elements, which causes the rolling elements to begin rolling in the opposite direction of rotation. The result is that the rolling elements are first decelerated and then change their direction of rotation, which leads to considerable frictional losses.

The same process is repeated, disregarding the force of gravity, when the rolling members pass through a second reversing means, through which the rolling members pass from the return-travel zone and onto the travel rail and toward the load zone. These difficulties are aggravated by the fact that when in rapid longitudinal movement, the rolling elements, due to their centrifugal force, are pressed with additional load against the reversing means, further increasing the frictional losses.

Therefore, the principal object of the present invention is to eliminate or reduce the component of the friction in the reversal regions that arises from this change in direction of rotation of the rolling elements. A further object is to substantially reduce the total frictional losses in these regions and throughout the system.

According to a central feature of the invention, a linear bearing for continuous longitudinal movement comprises a housing which defines at least one closed roller orbit for accommodating a plurality of rollers, each said roller orbit having an inner surface and an outer surface. Each said roller orbit also comprises a load zone and a return travel zone, which are interconnected at both ends thereof by respective reversal regions. The load zone is defined at least in part by a raceway which is located in the housing adjacent to the load zone for applying a load to rollers when they are accommodated in each said roller orbit, the raceway forming part of the outer surface of each said roller orbit.

According to another important feature of the invention, each roller has a section plane which passes through the center of the roller, perpendicular to its axis of rotation, and the respective section planes of the rollers in the load zone and the rollers in the return travel zone intersect along an axis which extends parallel to the load zone. These two section planes advantageously define an angle of about 15° to 60°. More preferably, the angle is from about 40° to 50°.

In another feature of the invention, each of the reversal regions includes a transitional region that is approximately helically curved. The reversal regions may also include two-dimensionally curved regions in which the axes of rotation of the rollers therein are substantially parallel to the axes of rotation of the rollers in the return travel zone.

The above-mentioned problems are solved by these features of the invention. For example, even in the reversal regions, the rolling members can continue to roll in the same direction of rotation as in the load zone. Since the raceway arranged on the housing adjacent to the load zone forms part of the outer surface (see FIG. 2) of each roller orbit, no reversal of the direction of rotation of the rollers necessarily takes place. This avoids the disadvantages of the prior art, in which the raceway of the load zone is arranged on the inner surface (see FIG. 1).

For considerations of space, it is desirable for the rolling members to be brought into and out of the load zone by reversal regions having the features mentioned above, which permit return travel of the rollers to take place in a region close to the load zone and the travel rail.

In order to minimize the total frictional losses in the reversal regions, it is preferable for the rolling elements to return through a return travel zone which is at a specified angle to the load zone, in accordance with the above-mentioned features, which provides a frictionally favorable angle of swing of the rollers with only a small amount of space being required.

The measures described also result in quiet operation of the rolling members. Furthermore, frictional losses, and thus also the consumption of energy, are reduced. All of this results in an increase in the life of the bearing. Furthermore, excellent load-bearing characteristics relative to the small space required and the low weight of the device are obtained.

The passage of the rollers from the load zone into the return-travel zone is frictionally most favorable if, in accordance with one aspect of the invention, a two-dimensionally curved section adjoins an approximately helically curved transitional region and these two sections provide a continuous transfer of the rollers from the load zone into the return-travel zone. This is facilitated by the axes of rotation of the rollers in the two-dimensionally curved section being in the same direction as in the return-travel zone.

Conditions are most favorable with respect to both construction and friction if, in accordance with another feature of the invention, the return-travel zone is oriented alongside the load zone, at an angle thereto of about 15° to 60°; and more preferably about 40° to 50°. In such case, with ordinary reversal radii and roller diameters, a favorable length of the closed roller orbits and optimal use of space are obtained.

The frictionally favorable guidance of the roller orbit in accordance with the invention can be provided not only with one orbit path but also, in accordance with further improved embodiments of the invention, with a larger number of roller orbit paths. For example, four roller orbits may be provided, in which case the axes of rotation of the rollers may advantageously form an X. Such arrangements were not possible with prior art linear bearings, in which the return travel path of the rollers was spaced away from and parallel to the load zone within the housing. The prior art arrangements therefore occupied a large amount of space. With X arrangements according to the invention a large reduction in occupied space is achieved, in that the return travel of the rollers takes place as close as possible to the travel rail. Further space is saved in accordance with another feature of the invention, wherein the roller orbits are preferably arranged within the main cross-section of the travel rail.

In order to obtain a bearing which can be easily disassembled for purposes of simple manufacture and inspection, in accordance with another feature of the invention the return travel paths are provided in cages which have openings on one side. When the travel rail is not present the rollers can be removed without difficulty.

Due to the presence of the openings in the cages, however, the rollers might drop out. It is therefore advisable to provide easily removable holding plates by means of which the openings can be completely or partially closed.

Also, in order to prevent the rollers in the load zone from falling out, as might be possible when the travel rail is not present, the holding plates can be provided with holding sections which extend or are bent away from the principal surface of the holding plate, and grip around the rollers. Larger holding sections may be provided on the outsides of the raceway regions and only small ones on the insides.

BRIEF DESCRIPTION OF THE DRAWINGS

Other objects, features and advantages of the invention will be seen from the following detailed description of preferred embodiments thereof, with reference to the drawings, in which.

DESCRIPTION OF THE PREFERRED EMBODIMENTS

Figure 1:
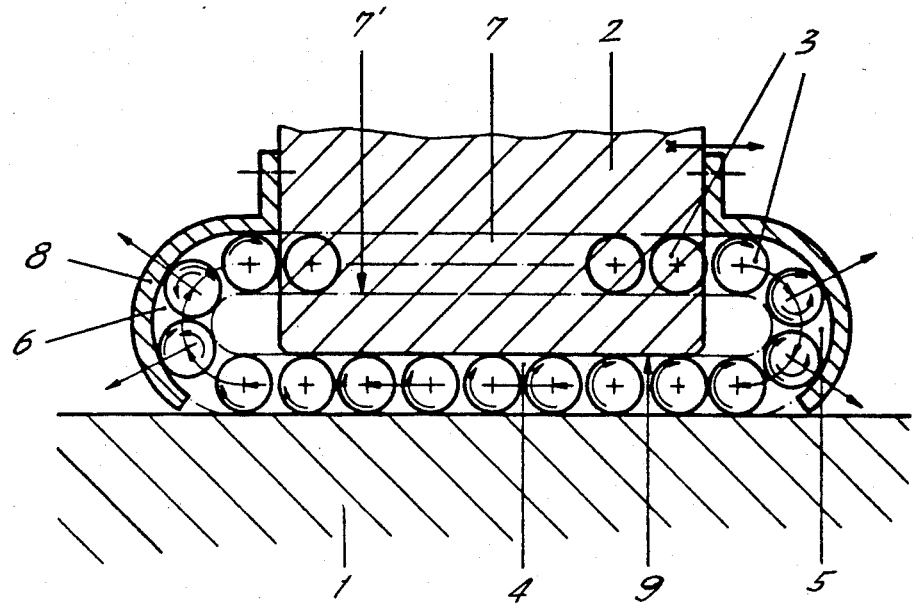
FIG. 1 is a longitudinal sectional view of a prior art linear bearing.

An example of a prior art linear bearing is shown diagrammatically in FIG. 1. Rollers 3 are arranged between a travel rail 1 and a housing 2. The closed roller orbit comprises a load zone 4, two reversal regions 5 and 6 and a return travel zone 7.

As shown in FIG. 1, the rollers 3 are given a clockwise direction of rotation in the load zone 4 as the housing 2 moves to the right. Then, when the rollers enter the reversal region 6 they are deflected upward by the deflection plate 8 toward the housing 2. Because of deflective and centrifugal forces, the rollers, in the reversal region 6, bear against the deflection plate 8, which is stationary with respect to the rollers. Therefore, the rollers in the reversal region 6 are initially decelerated, and then are caused to change to a counterclockwise direction of rotation, which results in frictional losses.

Then, in the return travel zone 7, the rollers rest against the lower raceway 7' as a result of gravity. This, in turn, again effects a change in the direction of rotation to clockwise, with further frictional losses. And finally, yet another disadvantageous change in direction of rotation is caused by deflective and centrifugal forces in the reversal region 5, before the rollers 3 pass ultimately into the load zone 4. In the load zone 4, a raceway 9, which forms part of the housing 2, corresponds to the inner surface of the roller orbit, said inner surface comprising the outwardly facing raceways 7' and 9 and the inner reversal curves that connect them.

Figure 2:
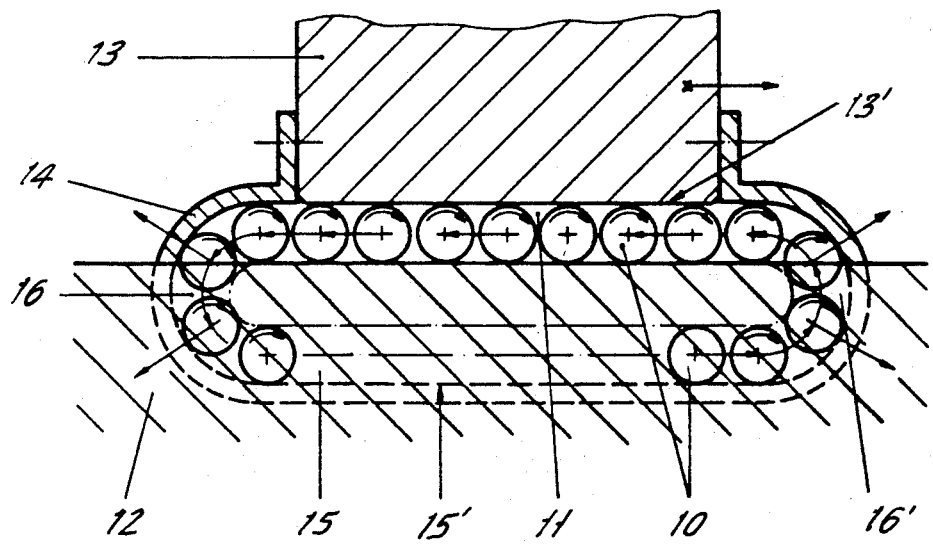
FIG. 2 is a schematic longitudinal sectional view of a linear bearing according to a first embodiment of the invention.

FIG. 2 is a schematic view of a roller orbit according to a first embodiment of the invention, which does not impose such detrimental changes in direction of rotation on the rollers. The rollers 10 in the load zone 11 between the travel rail 12 and the housing 13 are not forced to change their direction of rotation upon application against the deflection plate 14, which is also fastened to the housing 13. That is, the rolling conditions of the rollers may continue without change. The same applies to the return travel zone 15 when the force of gravity acts downward as seen in FIG. 2, and also applies to the reversal regions 16 and 16'.

These advantages result from the fact that the raceway 13' arranged on the housing 13 in the load zone 11 lies on the outer surface of each roller orbit, the outer surface comprising the two inwardly face raceways 13' and 15' as well as the outer surfaces of the reversal regions that connect them.

Figure 3:
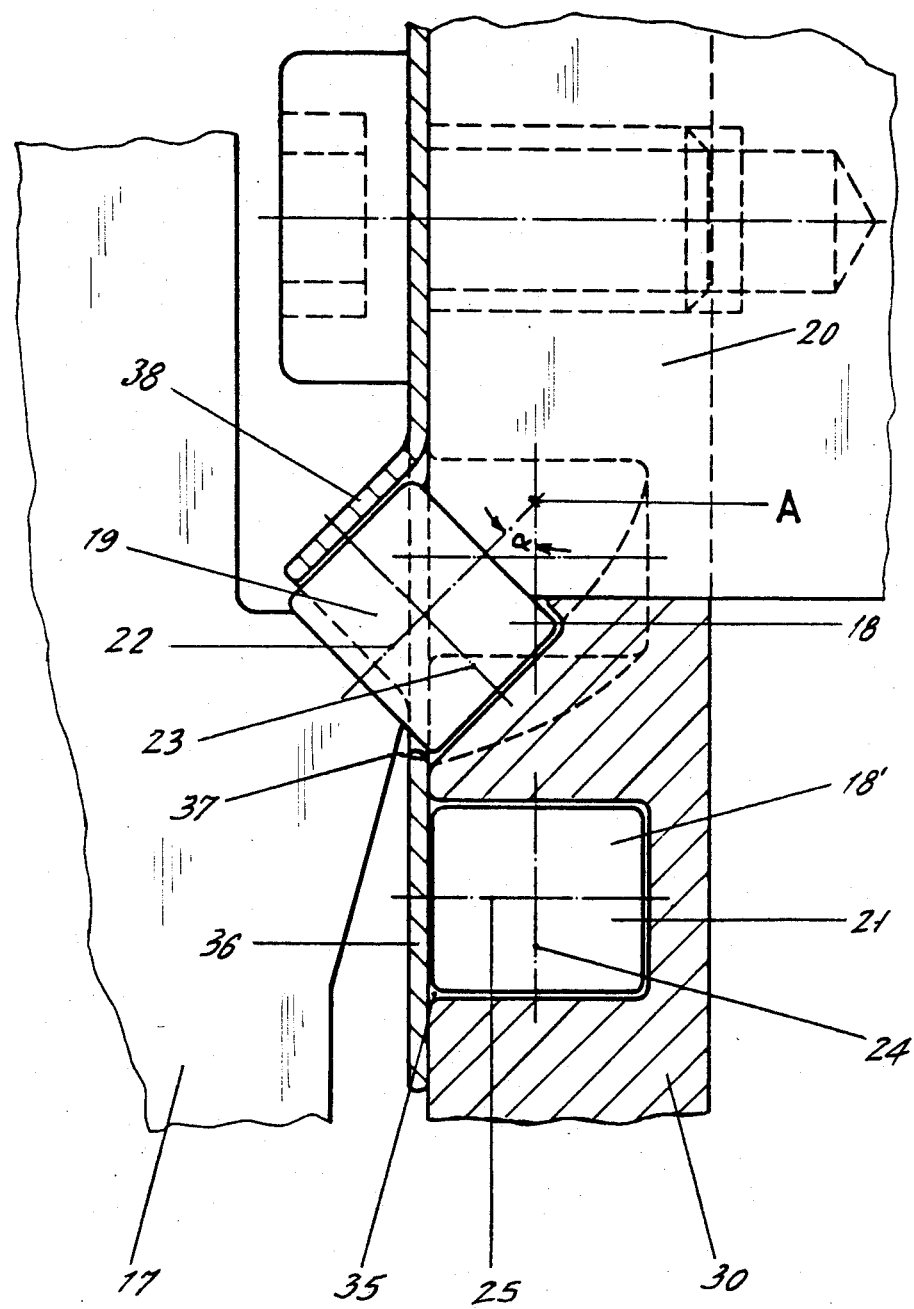
FIG. 3 is a transverse cross-section showing details of a linear bearing which may be used in the embodiment of FIG. 2.

FIG. 3 is an enlarged cross-sectional view showing details of a linear bearing for use in the first embodiment of the invention. Here the travel rail 17 is mounted for supporting the rollers 18 in the load zone 19 of the housing 20. After passing through the loading zone 19, the rollers 18' pass through a reversal region, which has been partially indicated in phantom, and into the return travel zone 21. The rollers are guided in cages 30.

In this embodiment, note the section plane 22, which passes through the center, perpendicular to the roller axes of rotation 23, of each of the load-bearing rollers 18. Note further the section plane 24, which passes through the center, perpendicular to the roller axes of rotation 25, of each of the rollers 18' in the return travel zone 21. These section planes intersect along an axis designated A, and the angle alpha formed by the section plane 22 and the section plane 24 is between about 15° and 60°, and more preferably between about 40° and 50°. This produces a return of the rollers over a short path, avoiding additional twisting of the rollers.

The cage 30 shown in FIG. 3 for the guidance of the rollers 18 and 18' has an opening 35, preferably adjacent to the return travel zone 21. In this way, there is obtained a cage 30 which is easy to manufacture and in which the rollers 18' can be easily inserted into the return travel zone 21. In order, however, to prevent the rollers 18' from falling out of the cage 30, particularly during the assembly of the bearing, the opening 35 is provided with a holding plate 36. This holding plate continues up into the region of the load zone 19 and here, has extended sections 37 and outwardly bent sections 38 which are arranged opposite the rollers 18. Thus, in this region also, the holding plate 36 holds the rollers 18 within the cage 30 and against the housing 20.

There is thus obtained a structural unit containing all parts, with the exception of the travel rail 17, which can be manufactured simply and easily installed and handled.

Figure 4:
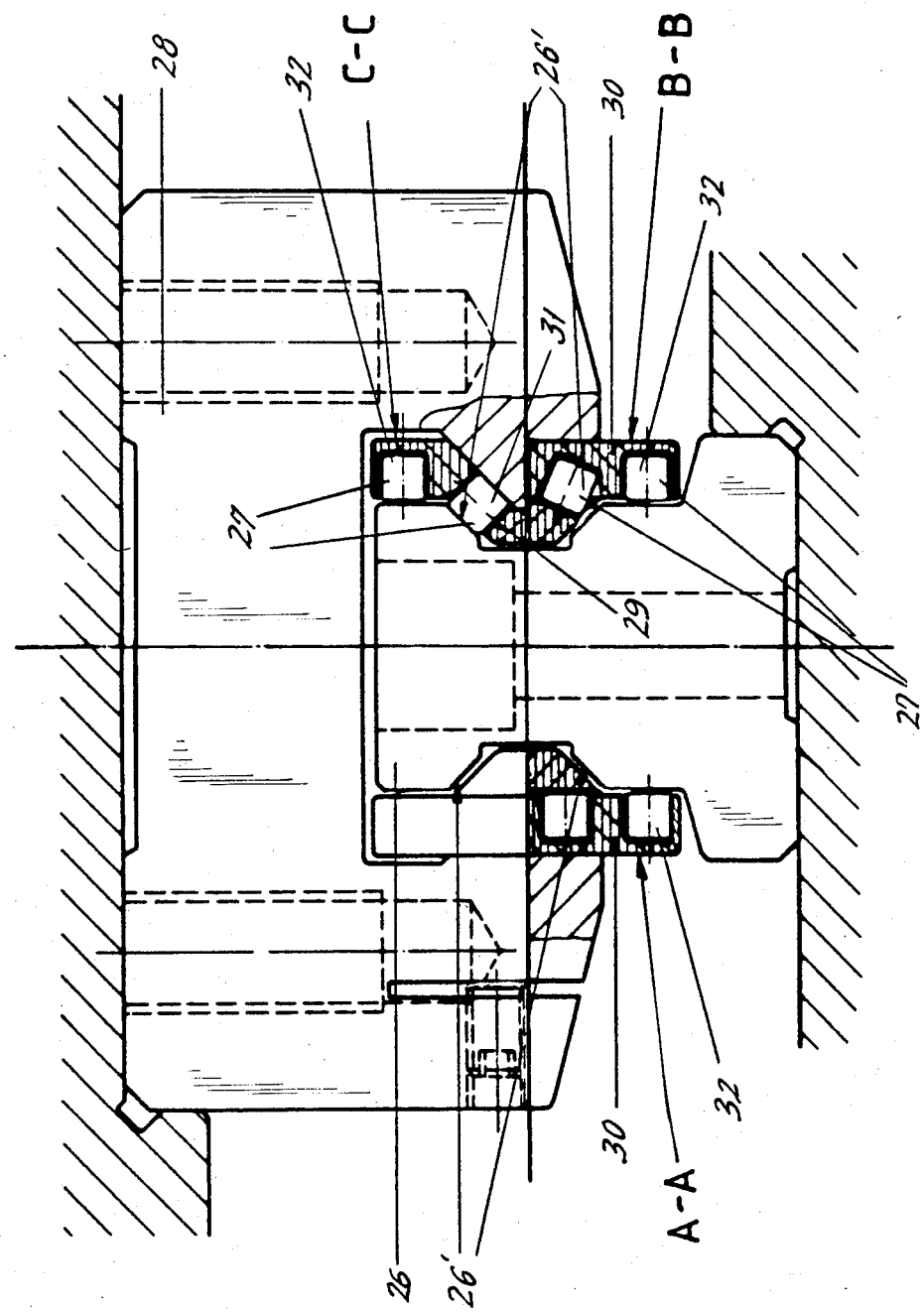
FIG. 4 is a transverse cross-sectional view of a linear bearing having four roller orbits according to a second embodiment of the invention.

FIG. 4 shows a linear bearing having four roller orbits, according to a second embodiment of the invention, seen in transverse cross-section. The travel rail 26 in this case has four raceways 26' in load zones. By means of the rollers 27 (only partially shown) guided in cages 30, the housing 28 is supported on all sides, the axes of rotation 29 of the rollers 27 forming an X-shape in the load zones.

Figure 5:
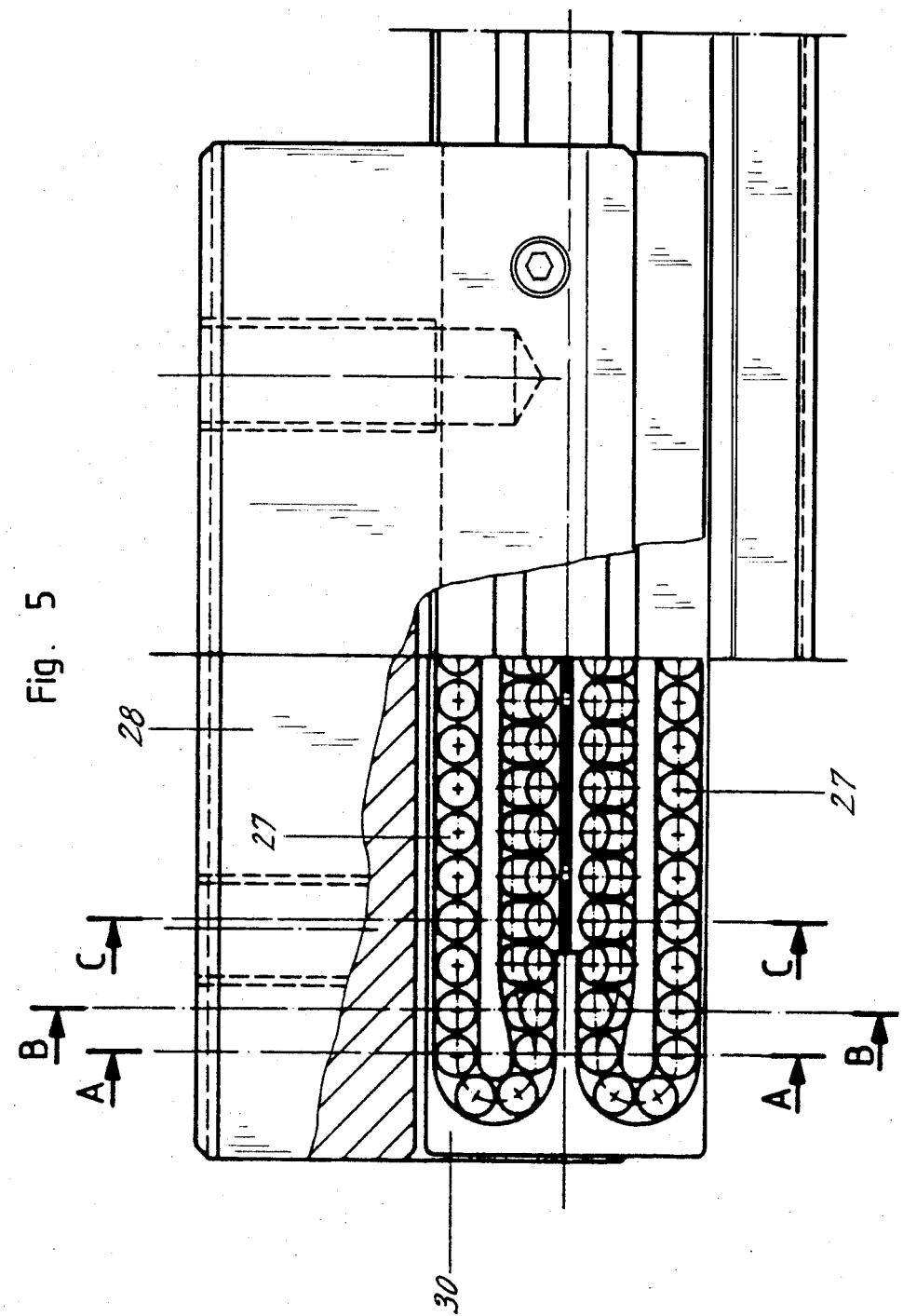
FIG. 5 is a view, partially in longitudinal cross-section, of the embodiment of FIG. 4.

The points at which the three individual cross-sections in FIG. 4 are taken, namely A—A, B—B and C—C, can be noted from the longitudinal sectional view shown in FIG. 5.

Figure 6:
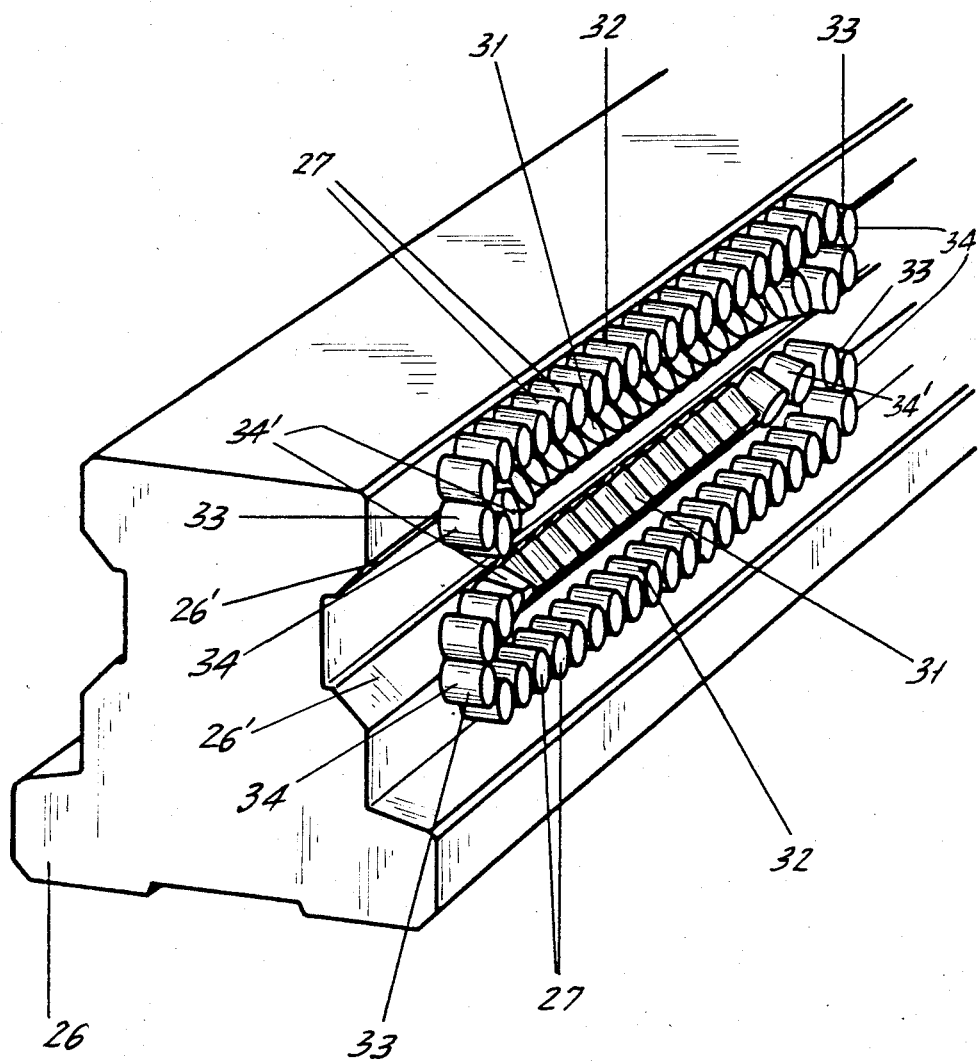
FIG. 6 is a perspective view of a linear bearing according to the embodiment of FIGS. 4 and 5, the housing being omitted.

FIG. 6 shows the same bearing as in FIGS. 4 and 5, only the travel rail 26 and the rollers 27 being shown. Here, the individual load zones and the positions of the rollers 27 in space for two roller orbits can be clearly noted. The rollers 27 travel in the load zones 31 of the raceways 26' of the travel rail 26, while the return zones 32 are arranged offset and twisted with respect to the load zones. Each reversal region 34 includes an approximately helically curved transitional region 34' and a two-dimensionally curved section 33, the latter passing into the return travel zone 32.

As can be noted in particular from FIG. 4, as a result of the construction described, there is obtained a compact linear bearing, particularly in that all four orbits can be arranged within the main cross-section corresponding to the greatest cross-sectional dimensions of the guide rail 26. In addition to the other advantages mentioned previously, the invention thus avoids the large amount of space occupied by the return travel zones in prior art devices, which were spaced away from the load zones within the housing.

Although preferred embodiments of the invention have been described herein, the same has been by way of illustration and not of limitation. Modifications and variations of the disclosed embodiments may occur to one skilled in the art within the spirit and scope of the invention, as limited only by the claims.

What is claimed is:

1. A linear bearing for continuous longitudinal movement comprising:
   a housing which defines at least one closed roller orbit for accommodating a plurality of rollers, each said roller orbit having an inner surface defining the inside surface of said roller orbit and facing outwardly of the orbit and an outer surface defining the outside surface of said roller orbit and facing inwardly of the orbit,
   each said roller orbit further comprising a load zone and a return travel zone which are interconnected at two ends thereof by respective reversal regions, and
   at least part of the load zone being defined by a raceway located in the housing adjacent to the load zone, for applying a load to such rollers when they are accommodated in each said roller orbit, said raceway forming part of said outer surface of each said roller orbit.

2. A bearing as in claim 1, wherein each of said reversal regions includes a transitional region that is approximately helically curved.

3. A bearing as in claim 2, wherein each of said reversal regions further includes a two-dimensionally curved region, in which the axes of rotation of rollers accommodated therein are substantially parallel to the axes of rotation of the rollers in the return travel zone.

4. A bearing as in claim 1, wherein when rollers are accommodated in each said roller orbit, a load zone section plane, which passes through the center of each roller in the load zone, perpendicular to an axis of rotation thereof, and a return travel zone section plane, which passes through the center of each roller in the return travel zone, perpendicular to an axis of rotation thereof, intersect along an axis which extends parallel to the load zone, and define an angle therebetween that is between about 15° and 60° as viewed from the direction of the rollers.

5. A bearing as in claim 4, wherein said housing defines four roller orbits, the respective axes of rotation of rollers accommodated in respective said roller orbits being oriented in an X arrangement.

6. A bearing as in claim 4, wherein said angle between said section planes is between about 40° and 50°.

7. A bearing as in claim 6, wherein said housing defines four roller orbits, the respective axes of rotation of rollers accommodated in respective said roller orbits being oriented in an X arrangement.

8. A bearing as in claim 4, further comprising a travel rail having a raceway for receiving such load applied to such rollers accommodated in each said roller orbit, by the raceway of the housing, so as to support said housing.

9. A bearing as in claim 8, wherein said housing defines four roller orbits, the respective axes of rotation of rollers accommodated in respective said roller orbits being oriented in an X arrangement.

10. A bearing as in claim 9, wherein said travel rail has a main cross-section corresponding to the greatest cross-sectional dimensions thereof, all four of said roller orbits being within said main cross-section of said travel rail when said housing is supported thereon.

11. A bearing as in claim 4, further comprising a cage in said housing for retaining such rollers for being accommodated in each said roller orbit, said cage having an opening for inserting such rollers into said cage adjacent to the return travel zone.

12. A bearing as in claim 11, wherein said opening is at least partially closed by a holding plate.

13. A bearing as in claim 12, wherein said holding plate further has holding sections adjacent to said load zone for holding such rollers in the load zone so that the respective section planes of the rollers in the load zone said the return travel zone define an angle therebetween.

14. A bearing as in claim 1, wherein said load zone and said return travel zone define a load zone section plane and a return travel zone section plane in each said roller orbit, said section planes being respectively substantially perpendicular to the axis of rotation of any rollers accommodated in said load zone and said return travel zone, said section planes being distinct from one another.

15. A bearing as in claim 14, wherein said section planes are out of parallelism with one another.

16. A bearing as in claim 15, wherein said section planes intersect so as to define an acute angle therebetween.

* * * * *